INVENTORS
LEONARD F. CHILTON
DOYLE H. JOHNSON

United States Patent Office 3,497,709
Patented Feb. 24, 1970

3,497,709
VEHICULAR POWER SUPPLY FOR ELECTRIC HAND TOOLS
Leonard F. Chilton, 77 Marigold, and Doyle H. Johnson, 1645 Pine St., both of Casper, Wyo. 82601
Filed Nov. 6, 1967, Ser. No. 680,627
Int. Cl. B62d *45/00;* H02g *3/00;* H02j *1/00, 3/00*
U.S. Cl. 307—10                              7 Claims

---

ABSTRACT OF THE DISCLOSURE

Power supply for conversion of the regulator-alternator electrical system of a vehicle to supply electrical power for the operation of electric hand tools comprising a switch means for selectively disconnecting the normally-connected output terminal of the alternator and the battery terminal of the regulator, for connecting the disconnected alternator output to an electrical load and for disconnecting the normally-connected neutral terminals of the alternator and the regulator and connecting the neutral terminal of the alternator to the battery whenever the output terminal of the alternator is disconnected from the battery terminal of the regulator.

---

Figure 1:
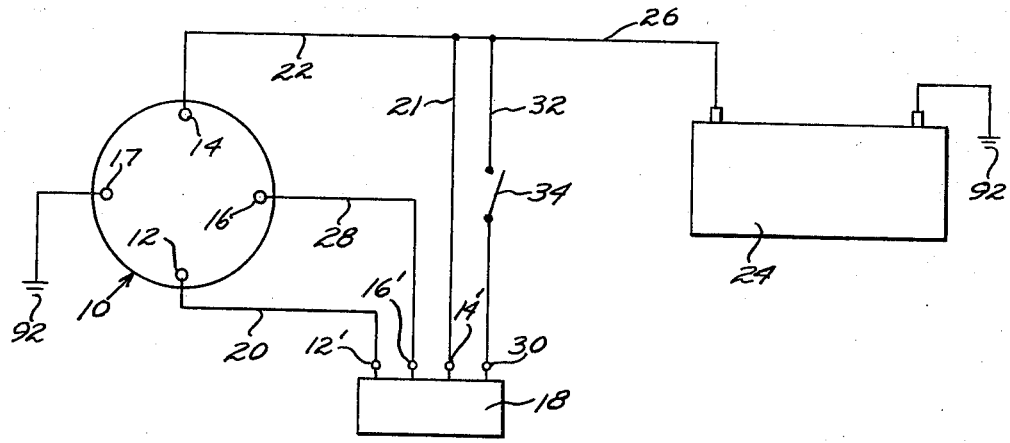

It has been long recognized that a power supply which can utilize the output of the electrical power generation system on present-day automobiles, trucks, tractors and the like to operate electric power tools would be highly advantageous. Most present-day vehicles utilize an AC type generator, commonly referred to as an alternator, which includes rectifiers providing a pulsed DC output for charging the battery and operating the accessories.

While the prior art has taught the use of electrical generating system of a vehicle for the purpose of powering tools operable on DC power and suggested the use of an alternator system for this purpose, the use of the prior art systems with alternators failed to recognize certain fundamental deficiencies in a converter designed for use on a DC generator when an attempt is made to use this same converter on an alternator. To do so results in serious damage or complete destruction of the regulator.

It is, therefore, the principal object of this invention to provide a power supply for the conversion of the regulator-alternator electrical system of a vehicle to supply electrical power for the operation of power tools and the like which avoids one or more of the disadvantages of prior art devices and has an improved power output.

The power supply according to this invention is adapted to be connected to a vehicle having an electrical circuit which includes a battery, an alternator and a regulator. The alternator is connected to be turned by the vehicle motor and is of the type having a field terminal, an output terminal and a neutral terminal, also known as an "R," "S," "N" or "Aux" terminal. The regulator is of the standard type or may be a solid state type and includes a field terminal connected to the field terminal of the alternator, a battery terminal normally connected to the output terminal of the alternator and to the battery, an ignition terminal connected through the ignition switch to the battery and a neutral terminal normally connected to the neutral terminal on the alternator.

For a better understanding of the present invention, together with other and further objects thereof, reference is had to the following description taken in connection with the accompanying drawing and its scope will be pointed out in the appended claims.

Figure 2:
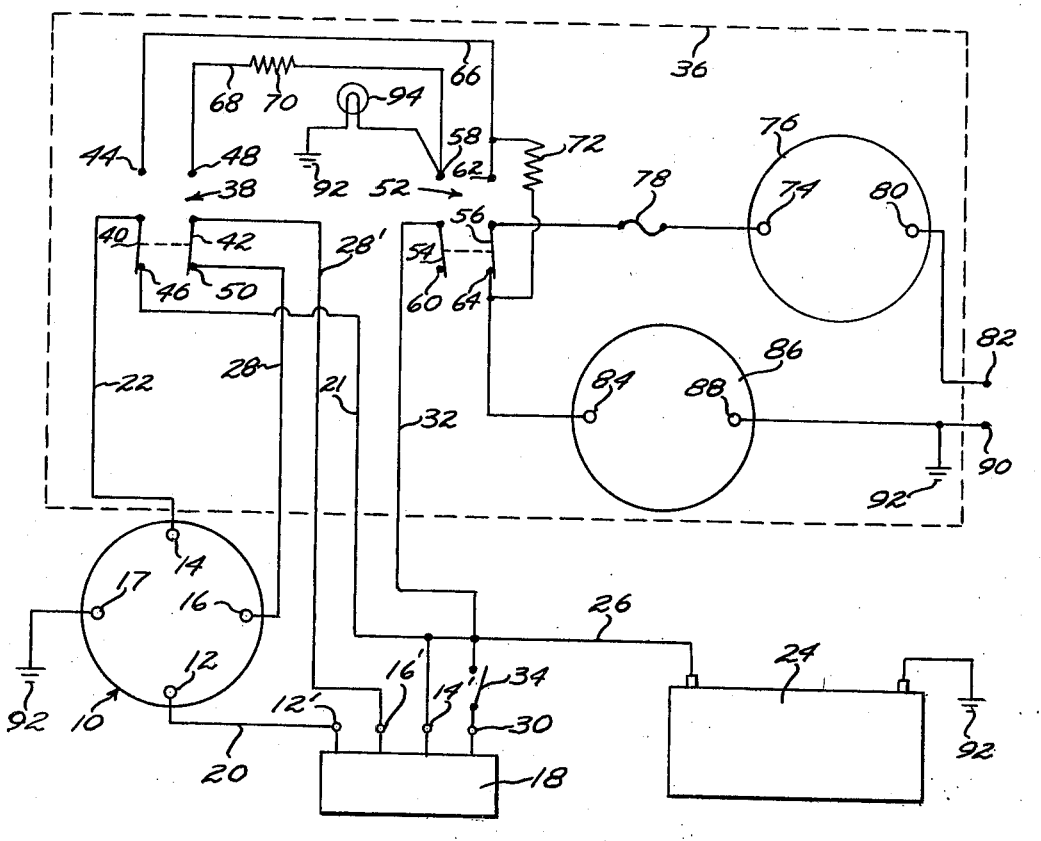

In the drawing:

FIGURE 1 is a simplified block diagram of the electrical circuit of a vehicle of the type to which the power supply of this invention may be applied; and, FIGURE 2 is a block diagram of the electrical circuit of the power supply of this invention showing it connected to the electrical circuit of the type shown in FIGURE 1.

Referring to FIGURE 1, there is shown an electrical circuit of a vehicle, including an alternator, to which the power supply of this invention may readily be applied. The alternator 10 is a standard AC generator type normally used in present-day modern automobiles such as the Delco "Delcotron," the Ford "Autolite" and alternators maunfactured by Motorola and Leece-Neville. The alternator is connected to be driven by the vehicle motor and has a field terminal 12, an output terminal 14 and a neutral terminal 16.

Also included in the circuit is the regulator 18 which serves to regulate the voltage and current. Regulator 18 has the field terminal 12' thereof connected to the field terminal 12 of the alternator by lead 20, the output terminal 14' thereof connected to the output terminal 14 of the alternator by leads 21 and 22 and to the battery 24 by lead 26, the neutral terminal 16' thereof connected to the neutral terminal 16 of the alternator by lead 28 and the ignition terminal 30 thereof is connected to battery 24 by means of leads 32 and 26 via ignition switch 34. Leads 22 and 26 may be connected to other accessories as required to supply electrical power thereto.

The voltage appearing on neutral terminal 16 of alternator 10 is proportional to the voltage appearing on output terminal 14 thereof. It is found that the voltage on neutral terminal is usually about one-half that appearing on the output terminal. The voltage on the neutral terminal is fed back to the regulator 18 and serves to control the power supplied to field terminal 12 which in turn controls the voltage appearing on output terminal 14. Thus, when the output terminal is disconnected from the battery load in order to produce the higher voltages required to operate power tools and the like on the order of from about 70 to about 90 volts, the voltage applied to the neutral terminal 16' of regulator 18 is from about 35 to about 45 volts which will destroy the regulator.

Referring now to FIGURE 2, the power supply of the invention may conveniently be contained within a cabinet for mounting in the vehicle and the cabinet is represented by the dotted line 36. The component parts of the power supply includes a double-pole double-throw switch 38 with armatures 40 and 42. Armature 40 selectively contacts poles 44 and 46 and armature 42 selectively contacts 48 and 50. The output terminal 14 of alternator 10 is connected to armature 40 of switch 38 via lead 22 and pole 46 of switch 38 is connected to battery terminal 14' of regulator 18. A second double-pole double-throw switch 52 is provided although it will be understood that switches 38 and 52 could be combined into a four-pole double-throw switch or be four single-pole double-throw switches. Switch 52 has two armatures 54 and 56 with armature 54 selectively contacting poles 58 and 60 and armature 56 selectively contacting poles 62 and 64.

Pole 44 of switch 38 is connected to pole 62 of switch 52 via lead 66 and pole 48 of switch 38 is connected to pole 58 of switch 52 via lead 68 and resistor 70, the purpose of which will be explained presently. The armature 54 of switch 52 is connected to the battery 24 via leads 32 and 26. Poles 62 and 64 of switch 52 are interconnected by resistor 72. Armature 56 of switch 52 is connected to one terminal 74 of an ammeter 76 via fuse 78. The other terminal 80 of ammeter 76 is connected to the terminal 82 of the power supply output. Pole 64 of switch 52 is connected to one terminal 84 of voltmeter 86 and the other terminal 88 is connected to the other terminal 90 of the power supply output.

The circuit of FIGURE 2 as shown is essentially that of FIGURE 1. With the armatures 40 and 42 of switch 38 contacting poles 46 and 50, the output terminal 14 of alternator 10 is connected to the battery terminal 14' of regulator 18 via lead 22, switch 38, and lead 21. The neutral terminal 16 is connected to the neutral terminal 16' of regulator 18 via lead 28, switch 38 and lead 28'. When switches 38 and 52 are actuated from that shown, armatures 40 and 42, respectively, are in contact with poles 44 and 48 of switch 38, and armatures 54 and 56 are in contact with poles 58 and 62, respectively, of switch 52. The output terminal 14 of alternator 10 is thus connected to terminal 82 of the power supply output via lead 22, armature 40 of switch 38, pole 44, lead 66, pole 62 of switch 52, armature 56, fuse 78 and ammeter 76. The other terminal 90 of the power supply output is connected to ground potential as at 92 as also is battery 24 and the alternator 10 via terminal 17. The neutral terminal 16' of regulator 18 is connected to the battery 24, via lead 28', armature 42 of switch 38, pole 48, lead 68 and resistor 70 in series, pole 58 of switch 52, armature 54 thereof and lead 32. In addition, pole 58 is connected to ground potential through pilot light 94. The value of resistor 70 is chosen such that the voltage supplied to neutral terminal 16' is slightly less than the normal potential of the battery. For example, where battery 24 is a 12 volt battery, resistor 70 is chosen to provide approximately a 10 volt potential at the neutral terminal 16' of regulator 18. Thus, it is seen that the neutral terminal 16 of alternator 10 is completely disconnected from regulator 18 and the potential can be allowed to rise to whatever magnitude necessary to power the job at hand without the overheating and destruction of the regulator. Resistor 72 is chosen of a value which will provide a ten to one voltage division when the switch 52 is in the actuated condition and the voltmeter can be read on the 0–150 volt range. When armature 56 is in contact with pole 64, resistor 72 is shunted and a potential applied across terminals 82 and 90 will be read on the low range of 0–15 volts.

The purpose of ammeter 76 is to register the amount of current flowing through the power supply and supplied to a load connected across contacts 82 and 90. When charging a battery with the power supply of FIGURE 2, a 6 volt battery requires approximately six minutes to fully charge, a 12 volt battery approximately ten minutes to fully charge and a 24 volt battery approximately 18 minutes to fully charge.

The present invention provides a relatively simple device which can be used successfully in conjunction with alternators having a neutral terminal without the destruction of the costly regulator as occurs with the prior art devices. While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the present invention.

What is claimed is:

1. A power supply for conversion of the regular-alternator electrical system of a vehicle to supply electrical power for the operation of electric power tools, said supply being adapted for attachment to a vehicle having an electrical circuit including a battery, an alternator, and a regulator, said regulator having a field terminal connected to the field terminal of said alternator, a battery terminal normally connected to the output terminal of said alternator and to the battery, an ignition terminal connected through an ignition switch to the battery and a neutral terminal normally connected to the neutral terminal of said alternator, said power supply comprising: an output load connection having two terminals;

first switch means for selectively disconnecting the output terminal of the alternator from the battery terminal of the regulator, for connecting the output terminal of the alternator to said output load connection and for selectively disconnecting the neutral terminal of the alternator from the neutral terminal of the regulator whenever the output terminal of the alternator is disconnected from the battery terminal of the regulator; and second switch means for connecting said neutral terminal of the regulator to the battery when said neutral terminal of the regulator is disconnected from the neutral terminal of the alternator.

2. The power supply of claim 1 wherein the switch means for connecting the neutral terminal of the regulator to the battery includes a resistance means for serial connection between said neutral terminal and said battery to provide a potential at said neutral terminal slightly less than the battery potential.

3. The power supply of claim 1 wherein an ammeter is connected in series with the output load connection and a voltmeter is connected thereacross.

4. The power supply of claim 1 wherein the first switch means comprises a double-pole double-throw switch with one armature being connected to the output terminal of said alternator and the other armature is connected to the neutral terminal of said regulator, the poles of said one armature being respectively connected to the battery terminal of said regulator and said battery and to the output load connection, the poles of the other armature being respectively connected to the neutral terminal of said alternator and to said battery.

5. The power supply of claim 1 wherein the first and second switch means comprises a pair of double-pole double-throw switches with one armature of said first switch being connected to the output terminal of said alternator and the other armature of said first switch is connected to the neutral terminal of said regulator; with one armature of said second switch being connected to said battery and the other armature of said second switch is connected to said output load connection; and one pole of said one armature of said first switch being connected to the battery terminal of said regulator and said battery and the other pole thereof being connected to one pole of said other armature of said second switch; one pole of said other armature of said first switch being connected to the neutral terminal of said alternator and the other pole being connected to one pole of said one armature of said second switch.

6. The power supply of claim 5 wherein a resistance means is serially connected between said one pole of said other armature of said first switch and said one pole of said one armature of said second switch.

7. The power supply of claim 6 including a resistance means connected between said one pole of said other armature of said second switch and said other pole of said other armature of said second switch, an ammeter connected between said other armature of said second switch and one terminal of said output load connection and a voltmeter connected between said other pole of said other armature of said second switch and said other terminal of said output load connection.

References Cited

UNITED STATES PATENTS

| | | | |
|---|---|---|---|
| 2,729,750 | 1/1956 | Draper et al. | 307—10 X |
| 2,913,589 | 11/1959 | Bell | 307—10 |
| 3,244,900 | 4/1966 | Colvill | 310—10 |
| 3,293,443 | 12/1966 | Burch | 307—38 |
| 3,316,416 | 4/1967 | Carlson | 307—10 X |

ROBERT S. MACON, Primary Examiner

T. B. JOIKE, Assistant Examiner